US010132196B2

(12) United States Patent
Wong et al.

(10) Patent No.: US 10,132,196 B2
(45) Date of Patent: *Nov. 20, 2018

(54) GAS TURBINE ENGINE SYSTEMS INVOLVING I-BEAM STRUTS

(75) Inventors: Joey Wong, Enfield, CT (US); Peter Chen, Manchester, CT (US); Dana P. Stewart, Vernon, CT (US); David N. Waxman, Manchester, CT (US); Michael A. Mike, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 1807 days.

This patent is subject to a terminal disclaimer.

(21) Appl. No.: 13/538,530

(22) Filed: Jun. 29, 2012

(65) Prior Publication Data
US 2013/0019609 A1    Jan. 24, 2013

Related U.S. Application Data

(63) Continuation-in-part of application No. 11/962,653, filed on Dec. 21, 2007, now Pat. No. 8,312,726.

(51) Int. Cl.
*F02C 7/20* (2006.01)
*F01D 25/16* (2006.01)
*F01D 9/06* (2006.01)
*F02K 1/80* (2006.01)

(52) U.S. Cl.
CPC ........... *F01D 25/162* (2013.01); *F01D 9/065* (2013.01); *F02K 1/80* (2013.01)

(58) Field of Classification Search
CPC .......... F01D 9/065; F01D 25/162; F02K 1/80
See application file for complete search history.

(56) References Cited

U.S. PATENT DOCUMENTS

| 2,616,662 A | * | 11/1952 | Mierley | ....................... 60/200.1 |
| 2,836,379 A | * | 5/1958 | Salmon | .......................... 244/15 |
| 3,312,448 A | | 4/1967 | Hull et al. | |
| 3,826,088 A | | 7/1974 | Nash et al. | |
| 4,429,923 A | | 2/1984 | White et al. | |
| 4,659,289 A | | 4/1987 | Kalogeros | |
| 4,820,117 A | | 4/1989 | Larrabee et al. | |
| 4,989,406 A | * | 2/1991 | Vdoviak et al. | ................ 60/762 |
| 5,292,227 A | | 3/1994 | Czachor et al. | |
| 5,427,348 A | | 6/1995 | Bacon et al. | |
| 5,634,767 A | * | 6/1997 | Dawson | ................ F01D 25/246 |
| | | | | 415/134 |
| 5,672,047 A | | 9/1997 | Birkholz | |
| 6,146,089 A | * | 11/2000 | Allen et al. | ....................... 415/9 |
| 6,149,380 A | * | 11/2000 | Kuzniar et al. | .................... 415/9 |
| 6,439,841 B1 | | 8/2002 | Bosel | |
| 6,792,758 B2 | | 9/2004 | Dowman | |

(Continued)

OTHER PUBLICATIONS

The Random House College Dictionary, Revised Edition, Random House, Inc., 1980, pp. 1050-1051.*

Primary Examiner — Lorne Meade
(74) Attorney, Agent, or Firm — O'Shea Getz P.C.

(57) ABSTRACT

Gas turbine engine systems involving I-beam struts are provided. In this regard, a representative strut assembly for a gas turbine engine includes a first I-beam strut having first and second flanges spaced from each other and interconnected by a web, the first strut exhibiting a twist along a length of the web.

17 Claims, 4 Drawing Sheets

(56) References Cited

U.S. PATENT DOCUMENTS

| | | | |
|---|---|---|---|
| 7,100,358 B2 | 9/2006 | Gekht et al. | |
| 7,186,073 B2 | 3/2007 | Orlando et al. | |
| 7,730,715 B2 * | 6/2010 | Grudnoski et al. | 60/796 |
| 8,312,726 B2 * | 11/2012 | Wong et al. | 60/796 |
| 2007/0264128 A1 * | 11/2007 | Grudnoski et al. | 416/244 R |
| 2010/0307165 A1 * | 12/2010 | Wong et al. | 60/796 |

* cited by examiner

GAS TURBINE ENGINE SYSTEMS INVOLVING I-BEAM STRUTS

CROSS-REFERENCE TO RELATED APPLICATIONS

This application is a continuation-in-part of U.S. patent application Ser. No. 11/962,653, now U.S. Pat. No. 8,312,726, which is hereby incorporated by reference in its entirety.

STATEMENT REGARDING FEDERALLY SPONSORED RESEARCH AND DEVELOPMENT

The U.S. Government may have an interest in the subject matter of this disclosure as provided for by the terms of contract number N00019-02-C3003 awarded by the United States Navy.

BACKGROUND

1. Technical Field

The disclosure generally relates to gas turbine engines.

2. Description of the Related Art

Gas turbine engines incorporate casings that are designed to encase internal components. These casings typically are attached to structural support members (e.g., struts) that extend inwardly from the casings and which are used to support the components. For example, solid struts can be used that incorporate aerodynamic fairings for facilitating airflow about the struts. As another example, hollow, box-type struts are used that incorporate aerodynamically desirable exterior shapes. These struts tend to increase stiffness while reducing weight because an associated fairing is not used.

SUMMARY

Gas turbine engine systems involving I-beam struts are provided. In this regard, an exemplary embodiment of a gas turbine engine comprises: a compressor; a combustion section operative to receive compressed air from the compressor; a turbine operative to drive the compressor; a casing operative to encase the compressor, the combustion section and the turbine; and a strut assembly interconnected with the casing and having a first strut configured as an I-beam.

An exemplary embodiment of a gas turbine engine exhaust casing comprises multiple struts, a first of the struts being configured as an I-beam having a web, a first flange located along a leading edge of the web, and a second flange located along a trailing edge of the web, the web extending between a first end and a second end, the first of the struts exhibiting a twist along a length thereof such that the first end and the second end form an included angle of between approximately 1.degree. and approximately 45.degree.

An exemplary embodiment of a strut assembly for a gas turbine engine comprises a first I-beam strut having first and second flanges spaced from each other and interconnected by a web, the first strut exhibiting a twist along a length of the web.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engine systems involving I-beam struts are provided, several representative embodiments of which will be described. In this regard, FIG. 1 is a schematic diagram depicting an exemplary embodiment of a gas turbine engine.

Figure 1:
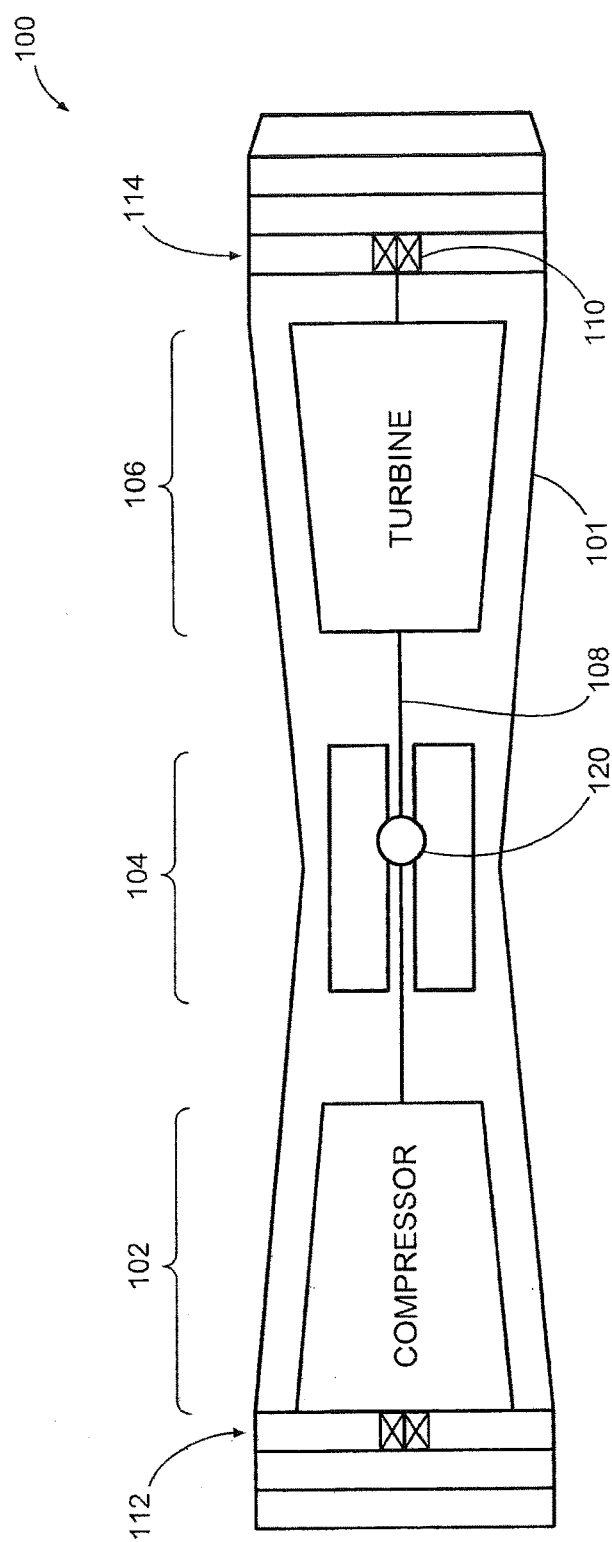
FIG. 1 is a schematic diagram of an exemplary embodiment of a gas turbine engine.

As shown in FIG. 1, engine 100 includes a casing 101 that houses a compressor section 102, a combustion section 104, a turbine section 106 and a shaft 108. In operation, gas is accelerated by the combustion section and provided to the turbine section. The turbine section converts axial motion of the gas into rotational motion, which is applied to the compressor section via the shaft. Notably, the shaft is supported by bearings (e.g., bearing 110) that are suspended within the casing 101 via strut assemblies 112, 114. Although engine 100 is depicted in FIG. 1 as a turbojet, there is no intention to limit the concepts described herein to use with turbojets, as various other configurations of gas turbine engines (e.g., such as turbofans) can be used.

Engine 100 also incorporates trunnions (e.g. trunnion 120) that are used to mount the gas turbine engine to another component, such as a nacelle. Notably, forces imparted to the casing via the trunnions tend to be non-axial. Therefore, strut assemblies typically are provided with increased material thickness in order to accommodate such forces.

Figure 2:
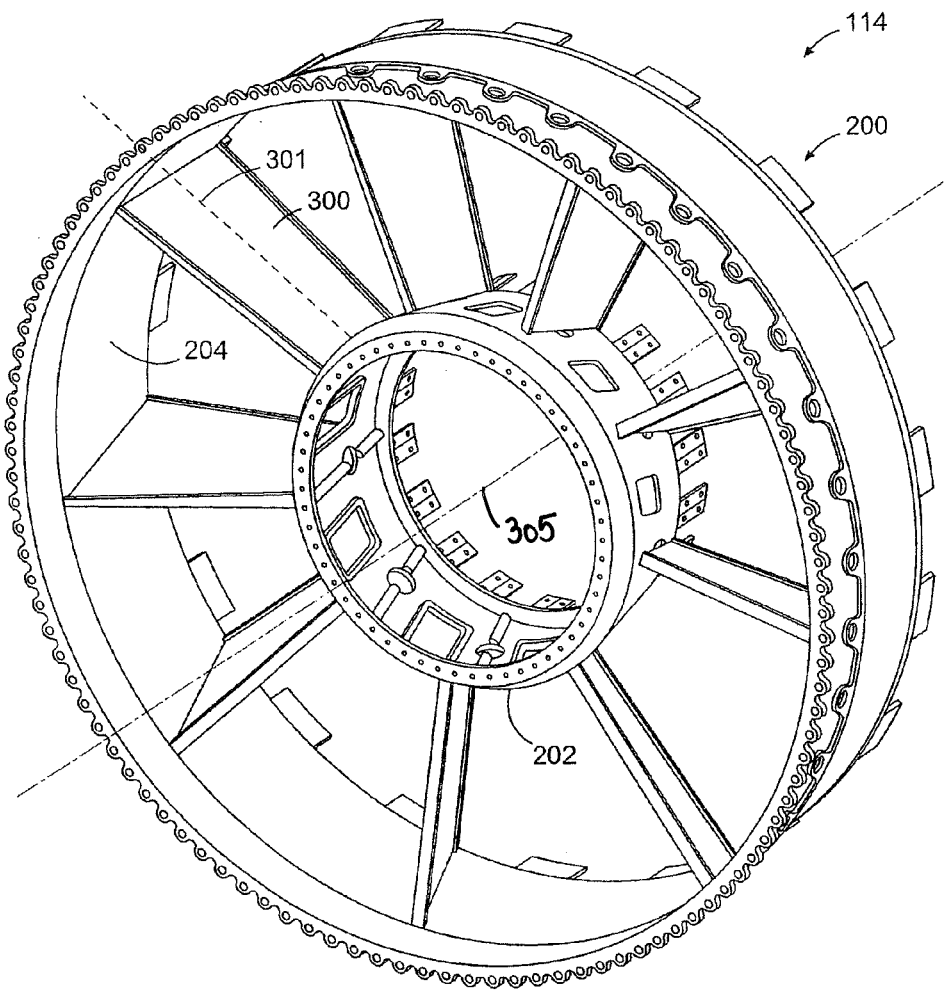
FIG. 2 is a schematic diagram depicting an embodiment of a turbine exhaust case incorporating an embodiment of a strut.

FIG. 2 is a schematic diagram depicting an embodiment of a strut assembly. Specifically, strut assembly 114 is depicted, which is configured as a portion of turbine exhaust case 200. As shown in FIG. 2, the strut assembly is provided in a ring-strut-ring configuration that incorporates an inner ring 202, an outer ring 204, and multiple struts (e.g., strut 300) extending between the rings. Notably, each of these struts exhibits a longitudinal axis (e.g., strut 300 has an axis 301) that is aligned with a corresponding radius extending from a centerline 305 of the turbine exhaust case to the outer ring 204. Additionally, each of these struts exhibits an I-beam configuration.

Figure 3:
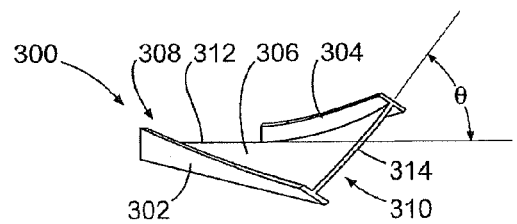
FIG. 3 is a schematic, end view of a representative strut from the embodiment of FIG. 3.

As shown in FIG. 3, strut 300 incorporates flanges 302 and 304 that are spaced from each other and interconnected by a web 306. Specifically, flange 302 is positioned along the leading edge of the strut and flange 304 is positioned along the trailing edge. The web and flanges extend between ends 308 and 310. By positioning the flanges 302 and 304 along the leading edge of the strut 300 and the trailing edge of the strut 300, respectively, trunnion stiffness of the engine 100 may be improved; e.g., the engine 100 may have improved ability to counteract forces imparted to the engine 100 which tend to cause movement of the inner ring 202 relative to the outer ring 204 along centerline 305, and vice versa. Also by positioning the flanges 302 and 304 along the leading edge of the strut 300 and the trailing edge of the strut 300, respectively, the engine 100 may have improved ability to counteract forces imparted to the engine 100 which tend to cause movement of the inner ring 202 relative to the outer ring 204 along an axis extending perpendicular to centerline 305, and vice versa. End 308 defines a first chord 312 that extends between the respective intersections of flanges 302 and 304 with web 306. End 310 defines a second chord 314 that extends between the respective intersections of flanges 302 and 304 with web 306. Notably, strut 300 exhibits a twist. That is, chords 312 and 314 are not co-planar.

In this embodiment, strut incorporates a consistent twist per unit length. This results in the chords 312, 314 defining an included angle (.theta.) of between approximately 1.degree. and approximately 45.degree., preferably between approximately 5.degree. and approximately 30.degree. Although the strut of FIG. 3 exhibits a twist along an entire length of the strut, a twist can be exhibited in various other configurations in other embodiments. By way of example, a twist can be exhibited over only a portion of the length of a web and/or be provided in varying degrees of twist per unit length.

The degree of twist per unit length of a strut is selected based, at least in part, on one or more of a number of considerations. Such considerations may include, but are not limited to: packaging constraints that define the available area for strut placement; matching the aerodynamic airfoil shape required to support turbine exhaust conditions; aerodynamic cooling requirements for changing and/or distributing available flow area; and providing structural support for trunnion loading. Notably, twist can be used to balance lateral and trunnion stiffness of an engine case per the art of balancing engine rotordynamics.

Figure 4:
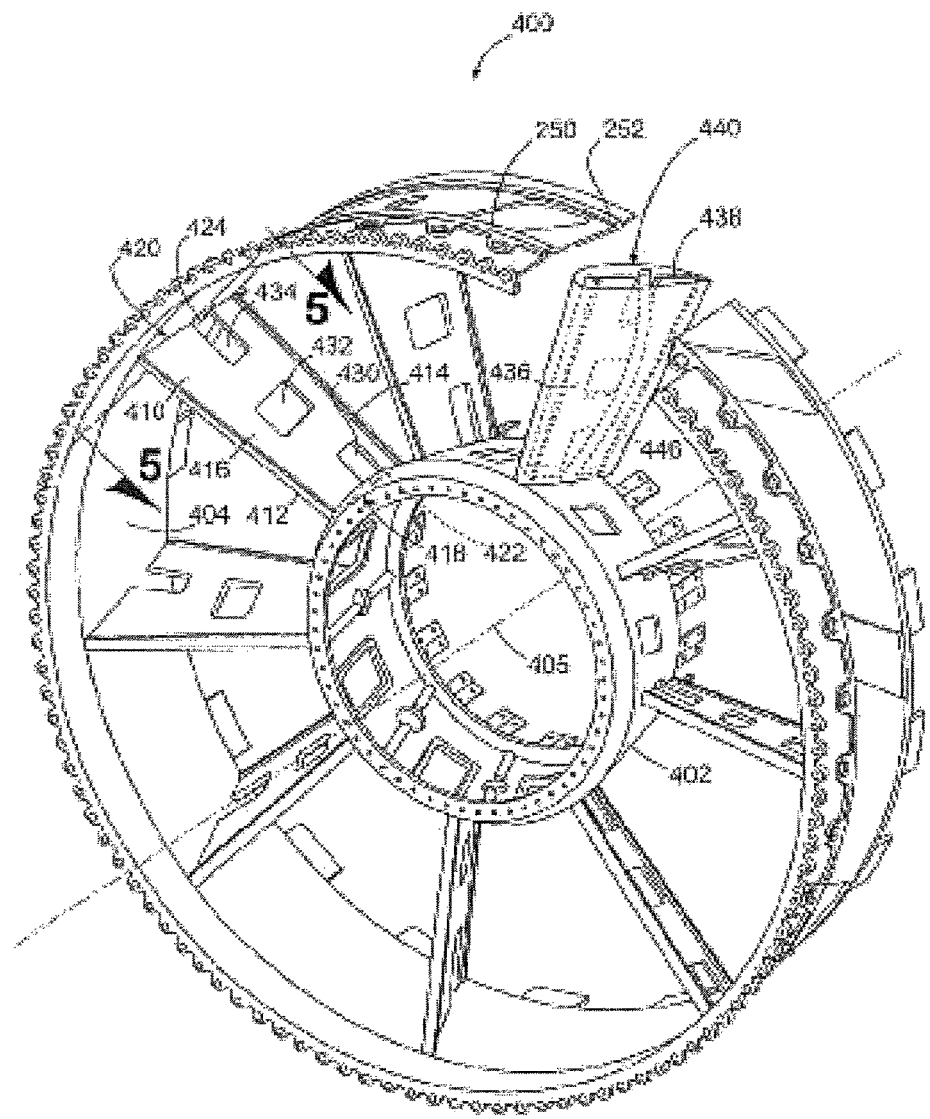
FIG. 4 is a schematic diagram depicting another embodiment of a turbine exhaust case, with multiple sections removed for clarity.

Another embodiment of a strut assembly is depicted in the schematic diagram of FIG. 4 (a portion of which is cut-away to facilitate an end view of one of the struts). As shown in FIG. 4, strut assembly 400 is configured as a portion of a turbine exhaust case that exhibits a ring-strut-ring configuration. It should be noted that although the embodiments of FIGS. 2 and 4 are provided in the ring-strut-ring configuration, I-beam struts are not limited to such uses.

In FIG. 4, strut assembly 400 incorporates an inner ring 402, an outer ring 404 located about a centerline 405, and multiple struts extending between the rings. For example, strut 410 extends between the rings. In this regard, strut 410 includes a flange 412 positioned along the leading edge of the strut and a flange 414 positioned along the trailing edge, with a web 416 spanning between the flanges. Web 416 and flanges 412, 414 extend between ends 418 and 420. End 418 defines a first chord 422 that extends between the respective intersections of flanges 412 and 414 with web 416. End 420 defines a second chord 424 that extends between the respective intersections of flanges 412 and 414 with web 416. Notably, strut 410 exhibits a twist, i.e., chords 422 and 424 are not co-planar.

It should be noted that, in the embodiment of FIG. 4, the struts incorporate cutouts that can be used for accommodating placement of fairing flanges and/or fasteners, routing cooling air, routing oil and/or routing electrical wiring. By way of example, strut 410 incorporates cutouts 430, 432 and 434. Notably, cutout 430 extends from web 416 across end 418, cutout 432 is located only in the web, and cutout 434 extends from the web across end 420.

In contrast to a conventional box-type strut that functions as a structural support as well as an aerodynamic component, the strut assembly of FIG. 4 incorporates I-beam struts for structural support and fairings for enhancing aerodynamic performance. For instance, fairing 436 surrounds strut 438. Notably, an interior cavity 440 is formed between an inner surface of the fairing and an outer surface of the strut. This cavity can be used for routing of fluids, e.g., oil, air, and/or wiring. In this regard, an oil conduit 446 is depicted within the cavity with cutouts being used for routing of the conduit.

Figure 5:
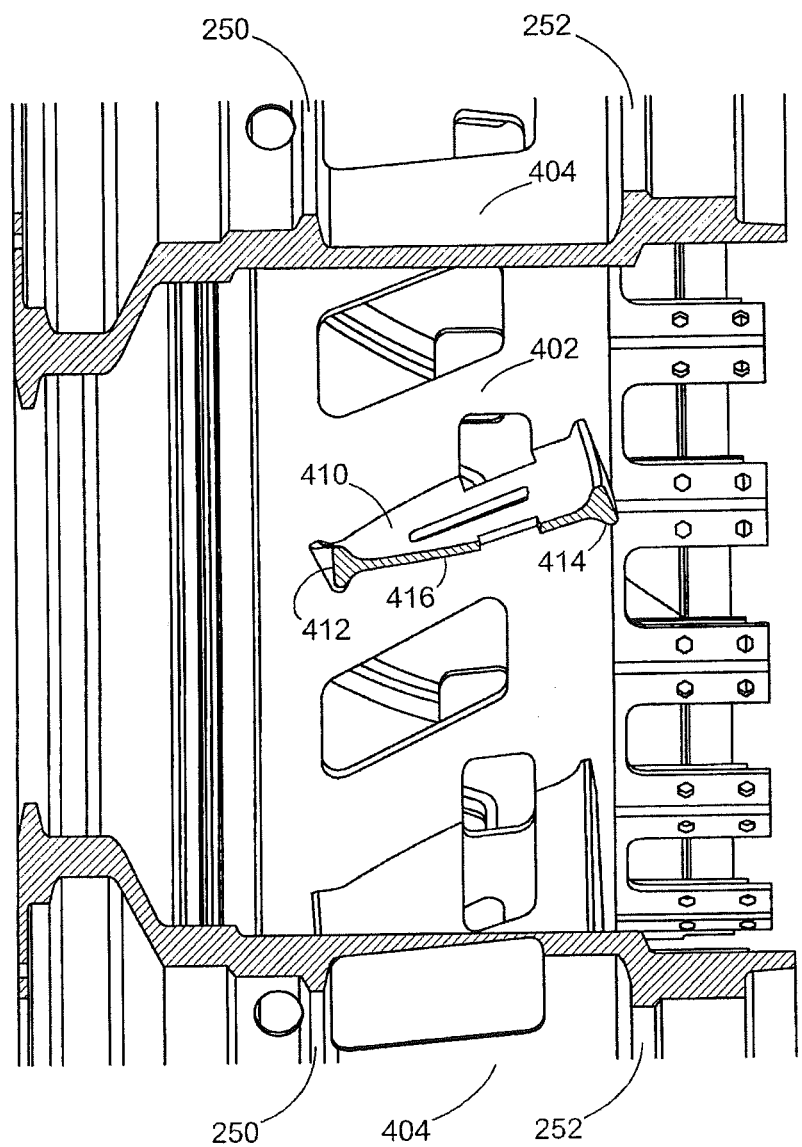
FIG. 5 is a schematic diagram depicting a portion of the embodiment of FIG. 4, as viewed along line 5-5.

It should be noted that I-beam struts potentially exhibit reduced weight compared to non-I-Beam struts that provide comparable strength and/or stiffness. Also, I-beam struts potentially reduce aerodynamic restrictions along gas flow paths as the struts may be narrower than non-I-Beam struts of comparable strength and/or stiffness. Additionally, material can be removed from the webs of I-beam struts (such as to provide passthroughs) without significantly impacting the structural integrity of the struts. Further, use of I-beam struts may allow for selective reinforcement of assemblies in which the struts are incorporated. By way of example, outer ring 404 of the ring-strut-ring assembly of FIG. 4 incorporates reinforced (e.g., thickened) annular portions located in the vicinity of the flanges. Specifically, as shown in FIG. 5, portion 250 is located in a vicinity of flange 412 and portion 252 is located in a vicinity of flange 252. The portions 250, 252 accommodate the transfer of stresses that tend to be applied to ring 404 by the struts at the flange locations. This may also translate into a potential weight savings in some embodiments as the ring-strut-ring assemblies can be structurally enhanced locally instead of across the width of the rings.

As is also shown in more detail in FIG. 5, strut 410 exhibits a camber, i.e., a curvature of the web that extends between the flanges. In some embodiments, such as that depicted in FIG. 5, the camber exhibited by a strut can be a simple camber, in which the camber is consistent along the length of the strut, or a complex camber. For instance, in some embodiments exhibiting a complex camber, the camber can vary along the length of the strut, such as by the web deflecting outwardly in one direction at one end of the strut and deflecting outwardly to a lesser degree at the other end. In other embodiments, the web can deflect outwardly in one direction at one end of the strut and deflect outwardly in the other direction at the other end, for example.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

What is claimed is:
1. A gas turbine engine comprising:
a compressor;
a combustion section operative to receive compressed air from the compressor;
a turbine operative to drive the compressor;
a casing operative to encase the compressor, the combustion section and the turbine;

a strut assembly interconnected with the casing and including an inner ring and an outer ring located about a centerline of the casing, and at least one strut interconnecting the inner ring and the outer ring;

wherein the at least one strut is configured as an I-beam and includes a web extending between a first end and a second end, a first flange located along a leading edge of the web, and a second flange located along a trailing edge of the web; and wherein the at least one strut is operable to prevent movement of the inner ring relative to the outer ring along the centerline, and vice versa.

2. The engine of claim 1, wherein the at least one strut exhibits a twist along a length thereof.

3. The engine of claim 2, wherein the at least one strut exhibits the twist such that the first end and the second end form an included angle of between approximately 1° and approximately 45°.

4. The engine of claim 3, wherein the first end and the second end form an included angle of between approximately 5° and approximately 30°.

5. The engine of claim 1, further comprising a fairing located along a gas path of the engine and positioned about the at least one strut.

6. The engine of claim 5, wherein the engine further comprises an oil conduit operative to direct oil, and wherein at least a portion of the oil conduit is positioned between the at least one strut and the fairing.

7. The engine of claim 6, wherein the at least one strut has a cutout formed therethrough, and wherein the oil conduit extends at least partially into the cutout.

8. The engine of claim 1, wherein the at least one strut exhibits a camber.

9. The engine of claim 1, wherein the at least one strut is one of multiple struts of the strut assembly, and wherein each of the multiple struts extends outwardly from the inner ring.

10. A gas turbine engine comprising:
a compressor;
a combustion section operative to receive compressed air from the compressor;
a turbine operative to drive the compressor;
a casing operative to encase the compressor, the combustion section and the turbine;
a strut assembly interconnected with the casing and including an inner ring and an outer ring located about a centerline of the casing, and at least one strut interconnecting the inner ring and the outer ring;

wherein the at least one strut is configured as an I-beam and includes a web extending between a first end and a second end, a first flange located along a leading edge of the web, and a second flange located along a trailing edge of the web; and wherein the at least one strut is operable to prevent movement of the inner ring relative to the outer ring along an axis extending perpendicular to the centerline, and vice versa.

11. The engine of claim 10, wherein the at least one strut exhibits a twist along a length thereof.

12. The engine of claim 11, wherein the at least one strut exhibits the twist such that the first end and the second end form an included angle of between approximately 1° and approximately 45°.

13. The engine of claim 12, wherein the first end and the second end form an included angle of between approximately 5° and approximately 30°.

14. The engine of claim 10, further comprising a fairing located along a gas path of the engine and positioned about the at least one strut.

15. The engine of claim 14, wherein the engine further comprises an oil conduit operative to direct oil, and wherein at least a portion of the oil conduit is positioned between the at least one strut and the fairing.

16. The engine of claim 15, wherein the at least one strut has a cutout formed therethrough, and wherein the oil conduit extends at least partially into the cutout.

17. The engine of claim 10, wherein the at least one strut exhibits a camber.

* * * * *